United States Patent
Zhao et al.

(10) Patent No.: US 10,330,200 B2
(45) Date of Patent: Jun. 25, 2019

(54) METHOD OF SEALING

(71) Applicants: Lei Zhao, Houston, TX (US); Zhiyue Xu, Cypress, TX (US)

(72) Inventors: Lei Zhao, Houston, TX (US); Zhiyue Xu, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 48 days.

(21) Appl. No.: 15/816,293

(22) Filed: Nov. 17, 2017

(65) Prior Publication Data

US 2018/0073636 A1 Mar. 15, 2018

Related U.S. Application Data

(62) Division of application No. 14/090,307, filed on Nov. 26, 2013, now Pat. No. 10,001,214.

(51) Int. Cl.
| | |
|---|---|
| *F16J 15/02* | (2006.01) |
| *F16J 15/06* | (2006.01) |
| *F16J 15/10* | (2006.01) |
| *F16J 15/12* | (2006.01) |
| *E21B 33/12* | (2006.01) |

(52) U.S. Cl.
CPC ......... *F16J 15/022* (2013.01); *E21B 33/1208* (2013.01); *F16J 15/021* (2013.01); *F16J 15/028* (2013.01); *F16J 15/068* (2013.01); *F16J 15/102* (2013.01); *F16J 15/104* (2013.01); *F16J 15/121* (2013.01); *F16J 15/128* (2013.01)

(58) Field of Classification Search
CPC .......... F16J 15/06; F16J 15/068; F16J 15/102; F16J 15/104; F16J 15/12; F16J 15/125; F16J 15/127; F16J 15/128; F16J 15/14; F16J 15/46; F16J 15/48
See application file for complete search history.

(56) References Cited

U.S. PATENT DOCUMENTS

| | | | |
|---|---|---|---|
| 4,397,472 A | 8/1983 | Czernik | |
| 4,457,491 A | 7/1984 | Dudman | |
| 4,665,978 A | 5/1987 | Luke | |
| 4,690,438 A | 9/1987 | Kanczarek | |
| 4,802,698 A | 2/1989 | Fujisawa et al. | |
| 4,826,181 A | 5/1989 | Howard | |

(Continued)

FOREIGN PATENT DOCUMENTS

| | | |
|---|---|---|
| EP | 0508017 B1 | 1/1996 |
| EP | 2333234 A3 | 8/2017 |
| GB | 2230326 A | 10/1990 |

OTHER PUBLICATIONS

Celzard et al., "Densification of expanded graphite", Carbon 40 (2002) pp. 2185-2191.

(Continued)

*Primary Examiner* — Nicholas L Foster
(74) *Attorney, Agent, or Firm* — Cantor Colburn LLP

(57) ABSTRACT

A method of sealing includes positioning graphite within a cavity defined by walls of a body, shifting the body along a tapered surface of a first structure, expanding the body through an interaction with the tapered surface, engaging at least one second structure with the walls, expanding the graphite, compressing the graphite against the at least one second structure, and sealing the graphite to the at least one second structure and the body.

10 Claims, 5 Drawing Sheets

(56) References Cited

U.S. PATENT DOCUMENTS

| | | | |
|---|---|---|---|
| 5,269,540 A * | 12/1993 | Nobuchi | F16J 15/128 |
| | | | 277/591 |
| 5,407,214 A | 4/1995 | Lew et al. | |
| 5,499,827 A | 3/1996 | Suggs et al. | |
| 5,522,603 A | 6/1996 | Naitou et al. | |
| 5,531,454 A | 7/1996 | Bomeby | |
| 5,542,681 A | 8/1996 | Hutchens et al. | |
| 5,622,372 A | 4/1997 | Fujisawa et al. | |
| 5,687,974 A | 11/1997 | Wilkinson et al. | |
| 5,928,807 A | 7/1999 | Elias | |
| 6,517,086 B1 | 2/2003 | Jamrog | |
| 6,862,852 B1 | 3/2005 | Beele et al. | |
| 7,328,685 B2 * | 2/2008 | Mockenhaupt | F01N 13/10 |
| | | | 123/315 |
| 2003/0209857 A1 | 11/2003 | Keene | |
| 2006/0272321 A1 | 12/2006 | Mockenhaupt et al. | |
| 2008/0042366 A1 | 2/2008 | Awtar et al. | |
| 2009/0108534 A1 | 4/2009 | Ueda | |
| 2009/0126945 A1 | 5/2009 | Sharma et al. | |
| 2009/0295103 A1 | 12/2009 | Ebina et al. | |
| 2010/0164176 A1 | 7/2010 | Beele | |
| 2010/0264607 A1 | 10/2010 | Ueda et al. | |
| 2011/0120697 A1 | 5/2011 | Buckle | |
| 2011/0148094 A1 | 6/2011 | Asakura et al. | |
| 2011/0287677 A1 | 11/2011 | McManus et al. | |
| 2013/0039738 A1 | 2/2013 | Rai et al. | |
| 2016/0090812 A1 * | 3/2016 | Zhao | E21B 33/1208 |
| | | | 166/387 |
| 2016/0145965 A1 | 5/2016 | Zhao et al. | |

OTHER PUBLICATIONS

Doane, et al, "Pushing the Boundary of Ultra-HPHT Completion Technology: The First 20,000 psi, 470° F. Permanent Production Packer for As-Rolled Casing", IPTC 16852.

Frenzelit; "High-Pressure Gasket Material Made From Expanded Graphite for Maximum Performance and Perfect Handling"; Novaphit SSTC and Novaphit MST; www.frenzelit.com; 8 pgs.

Frenzelit; "Novaphit—High-Pressure Gasket Material Made from Expanded Graphite for Maximum Safety Requirements"; www.frenzelit.com; 8 pgs.

Garfield, et al.; "Metal-to-Metal Sealing Technology: Bridging the Gap Between Conventional and High-Expansion Zonal Isolation Applications"; Copyright 2007, Society of Petroleum Engineers; SPE International; SPE 107107; 6 pgs.

Notification of Transmittal of the International Search Report and the Written Opinion of the International Searching Authority; PCT/US2014/061547; Korean Intellectual Property Office; dated Jan. 28, 2015; 12 pages.

Shen, et al.; "Recent Advances With Expandable Graphite in Intumescent Flame Retardant Technology"; NYACOL; Nano Technologies, Inc.; Retrieved from Internet Mar. 10, 2015; URL: http://www.nyacol.com/exgraphadv.htm; 7 pgs.

* cited by examiner

METHOD OF SEALING

CROSS REFERENCE TO RELATED APPLICATION

This application is a divisional application of U.S. application Ser. No. 14/090,307 filed Nov. 26, 2013, the disclosure of which is incorporated by reference herein in its entirety.

BACKGROUND

Elastomers are commonly used to seal members to one another because of their ability to seal to surfaces that are rough or include imperfections. Applications for such seals include tubular systems employed in earth formation boreholes such as in the hydrocarbon recovery and carbon dioxide sequestration industries. Such seals however can degrade at high temperatures and high pressures and in corrosive environments. Operators, therefore, are always receptive to new sealing arrangements and methods that overcome these shortcomings.

BRIEF DESCRIPTION

Disclosed is a method of sealing including positioning graphite within a cavity defined by walls of a body, shifting the body along a tapered surface of a first structure, expanding the body through an interaction with the tapered surface, engaging at least one second structure with the walls, expanding the graphite, compressing the graphite against the at least one second structure, and sealing the graphite to the at least one second structure and the body.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
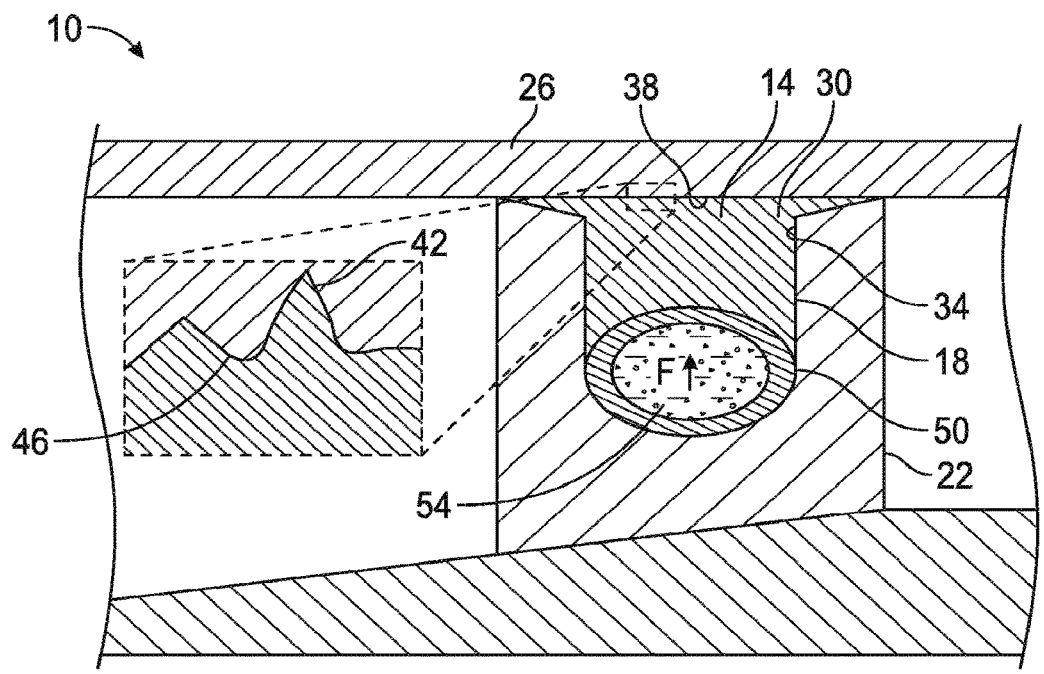
FIG. 1 depicts a partial cross sectional view of a seal arrangement disclosed herein in a sealing position.

Referring to FIG. 1, an embodiment of a seal arrangement disclosed herein is illustrated generally at 10. The seal arrangement 10 includes expandable graphite 14 positioned within a cavity 18 in a body 22, and the graphite 14 sealably engages with a structure 26 proximate an opening 30 in the body 22. The graphite 14 is volumetrically expandable in response to specific changes in environment such as changes in temperature, for example. Volumetric expansion of the graphite 14 causes it to be forcedly engaged with walls 34 of the body 22 as well as to forcedly engage with a surface 38 of the structure 26. The graphite 14 is deformable such that it conforms to troughs 42, peaks 46 and other imperfections in the surface 38 creating a seal between the graphite 14 and the structure 26 in the process. The graphite 14 also seals to the walls 34 of the body 22 thereby resulting in the body 22 being sealably engaged to the structure 26. The graphite 14 is configured to plastically deform at loads below where it elastically deforms. And it is the plastic deformation that allows the graphite 14 to contour to the surface 38 and form a seal therewith.

The graphite 14 in its expanded state is compressible and therefore has resiliency. This resiliency allows it to maintain loading against the body 22 and the structure 26 and maintain sealing thereto even during changes in the volume of the cavity 18. An optional second compressible member 50 can be positioned within the cavity 18 that also is resilient and therefore provides additional compressive forces to the graphite 14. Although other embodiments are contemplated, the resilient member 50 in this embodiment is a tubular shaped hoop with a compressible fluid 54 sealed therewithin. As forces on the resilient member 50 flatten the cross sectional shape that is initially round, the decrease in volume of the compressible fluid 54 causes pressure therein to resiliently increase.

Figure 2:
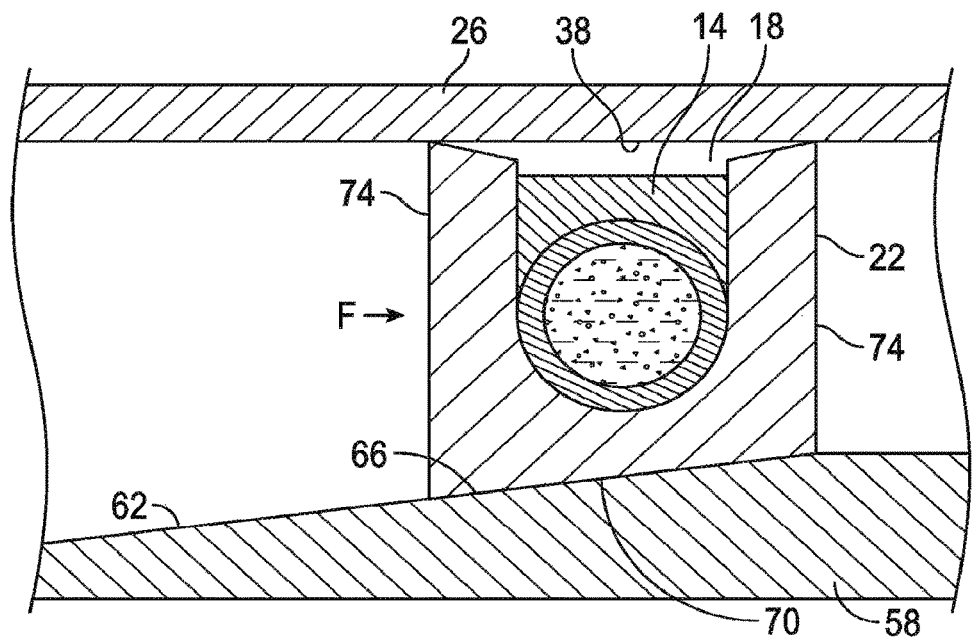
FIG. 2 depicts a partial cross sectional view of an embodiment of the seal arrangement of FIG. 1 in a non-sealing position.

Referring to FIG. 2, an embodiment of the seal arrangement 10 is illustrated at a position prior to the graphite 14 being sealingly engaged with the structure 26. In this embodiment, the structure 26 is a tubular with only a small portion of a quarter cross section being shown. The surface 38 of the structure 26 in this case is the inner radial surface of the tubular 26. A second tubular 58 is positioned radially within the structure 26 and substantially concentric with the structure 26. An outer radial surface 62 of the second tubular 58 has a ramped portion 66, which is frustoconical such that radial dimensions of the outer ramped portion 66 increase toward the right side of the Figure. The body 22, when moved rightward in the Figure, has an inner radial face 70 that engages with the surface 62 and radially expands as the rightward movement continues. Walls 74 of the body 22, which are substantially perpendicular to the face 70 in this embodiment, also grow radially as the body 22 is moved relative to the ramped portion 66. After sufficient radial growth the walls 74 engage with the surface 38 of the structure 26, thereby enclosing the cavity 18 and encasing the graphite 14 therewithin while allowing fluids or gases to escape. Volumetric expansion of the graphite 14 causes it to fill the cavity 18 and generate compressive forces against the surface 38. These compressive forces are sufficient to sealingly engage the graphite 14 with the surface 38 even when the surface 38 includes the troughs 42 and peaks 46 discussed above in reference to FIG. 1.

It should be noted that the volume of the cavity 18 increases as the radial dimensions of the body 22 increase prior to engagement of the walls 74 with the structure 26. The expansion of the graphite 14 is selected to be greater than the volumetric increase of the cavity 18 and as such the graphite 14 is able to fill the increased sized cavity 18. In fact, the graphite 14 can expand between about 50% and 200% in volume.

Figure 3:
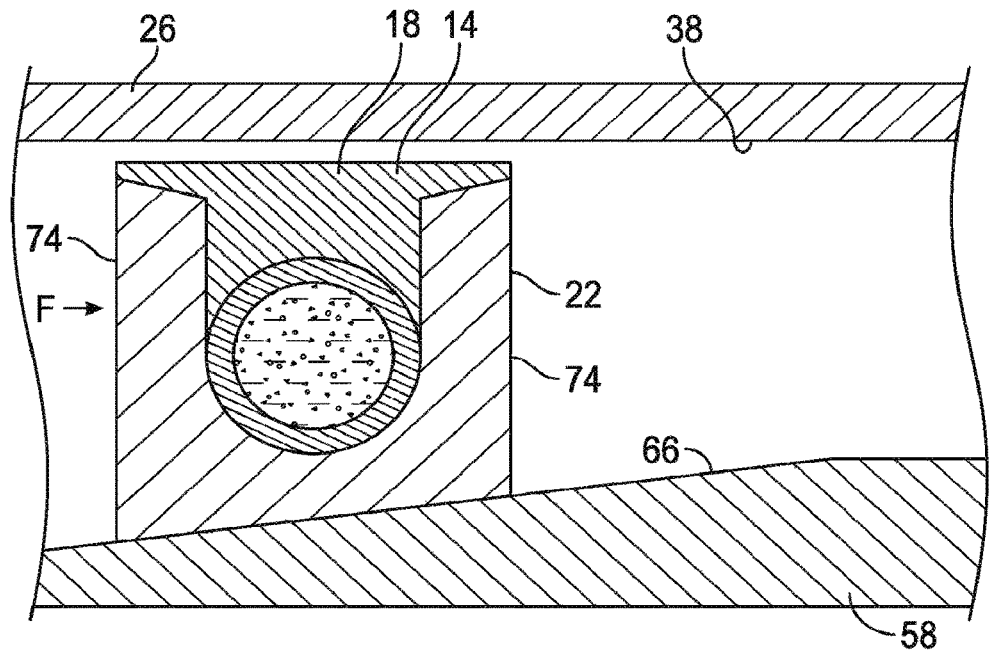
FIG. 3 depicts a partial cross sectional view of an alternate embodiment of the seal arrangement of FIG. 1 in a non-sealing position.

Referring to FIG. 3, an alternate embodiment of the seal arrangement 10 is illustrated at a position prior to the graphite 14 being sealingly engaged with the structure 26. This embodiment is similar to that of FIG. 2 with the primary difference being that the graphite 14 in this embodiment is expanded prior to the body 22 being moved up the ramped portion 66 into engagement with surface 38. In this embodiment some of the graphite 14 may be "wiped" out of the cavity 18 as the graphite 14 contacts the surface 38 prior to the walls 74 contacting the surface 38. This condition does not alter the function of the embodiment since enough of the graphite 14 will be radially compressed into the cavity 18 via contact with the surface 38 prior to engagement of the body 22 with the structure 26 to generate the resilient forces in the graphite 14 sufficient to cause the graphite 14 to seal to both the surface 38 and the body 22. Other embodiments (not shown) can incorporate elements of both FIG. 2 and FIG. 3 in that the graphite 14 can expand both before the walls 74 engage the surface 38 and after.

Figure 4:
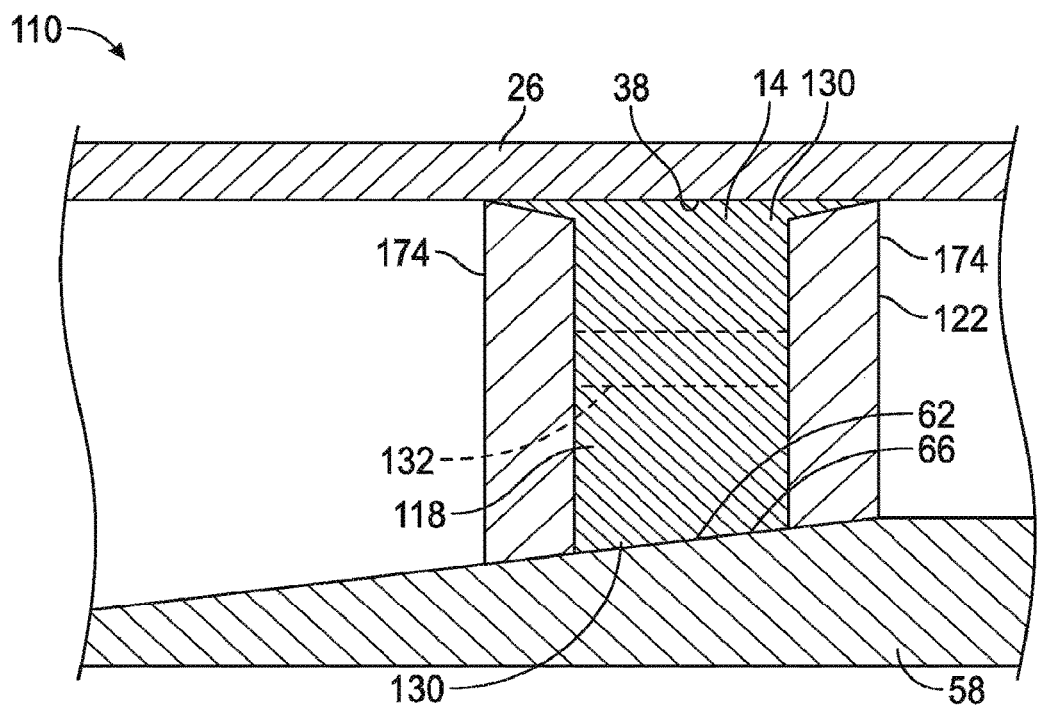
FIG. 4 depicts a partial cross sectional view of an alternate seal arrangement disclosed herein.

Referring to FIG. 4, an alternate embodiment of a seal arrangement disclosed herein is illustrated at 110. The seal arrangement 110 differs from the seal arrangement 10 in that a body 122 that defines cavity 118 containing the graphite 14 has two openings 130. One of the openings 130 faces radially outwardly in a fashion similar to that of the earlier describe embodiments, and one of the openings 130 faces radially inwardly. Resilient forces, due to the volumetric compression of the graphite 14 within the cavity 118, cause the graphite 14 to sealingly engage with the surface 38 and the outer radial surface 62 of the second tubular 58 in addition to walls 174 of a body 122. Note in this embodiment the compressive forces are generated by the graphite 14 alone since a version of the second resilient member 50 is not employed. Additionally, structural members 132 (one being shown in phantom) of the body 122 extend through the graphite 14 while holding the walls 174 a fixed distance apart without detrimentally affecting the functioning of the seal arrangement 110.

Figure 5:
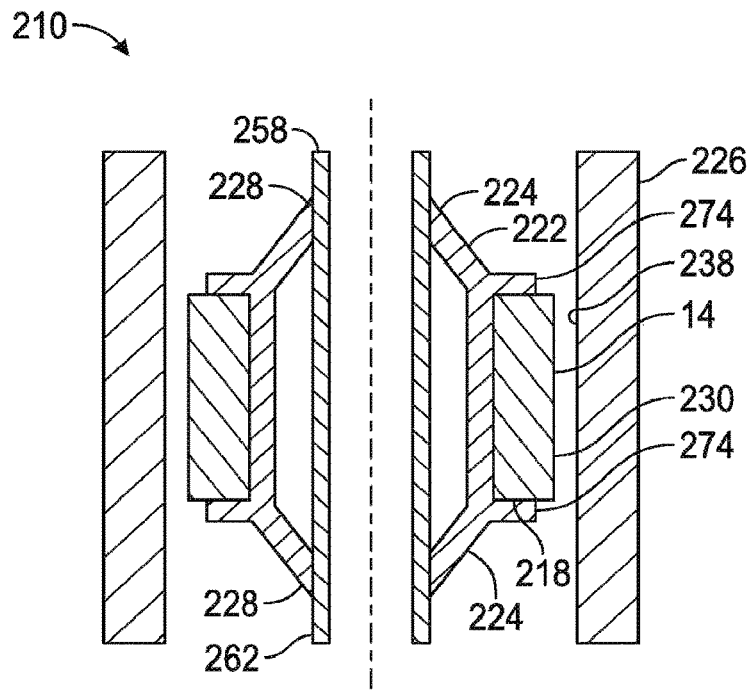
FIG. 5 depicts a partial cross sectional view of another alternate seal arrangement disclosed herein in a non-sealing position.
Figure 6:
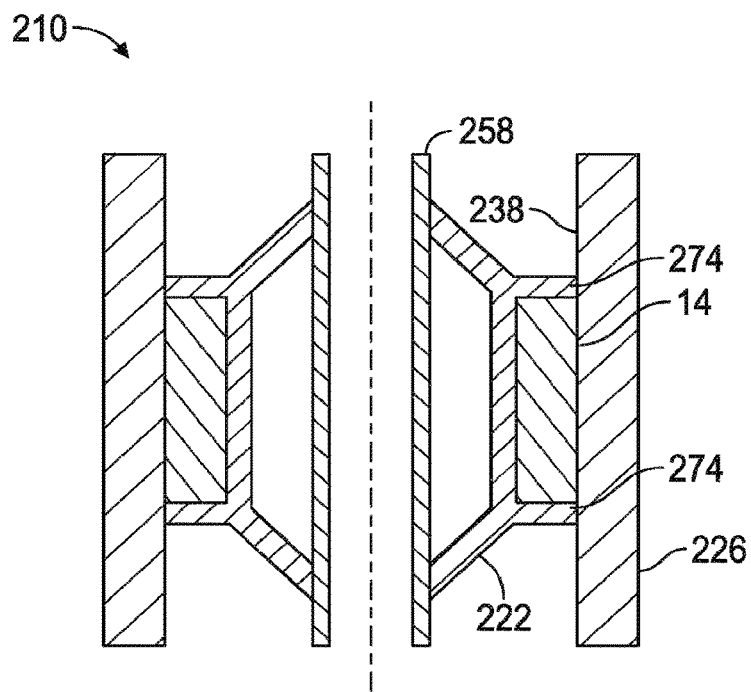
FIG. 6 depicts a partial cross sectional view of the seal arrangement of FIG. 5 in a sealing position.

Referring to FIGS. 5 and 6, an alternate embodiment of a seal arrangement disclosed herein is illustrated at 210. The seal arrangement 210 includes two structures 226, 258 that are sealable to one another by a body 222 and the expandable graphite 14. The body 222 defines a cavity 218 that houses the graphite 14. The body 222 includes an opening 230 that is closed by engagement of walls 274 of the body 222 with a surface 238 that in this embodiment is an inner radial surface of a tubular that is the first structure 226. At least one of two frustoconically oriented legs 224 of the body 222 slidingly engage with an outer radial surface 262 of the second structure 258. Longitudinally moving ends 228 of the legs 224 toward one another causes the walls 274 to move radially outwardly until they engagably contact the surface 238, thereby enclosing the graphite 14 within the cavity 218. The graphite 14 as shown in FIG. 5 (in the non-sealing position), is already volumetrically expanded such that a portion of it extends through the opening 230 and outside of the cavity 218. Simultaneously moving both of the legs 224 can cause the graphite 14 to move radially only into contact with the surface 238 thereby avoiding any scrapping of the graphite 14 with the surface 238 that would occur if there were relative longitudinal movement therebetween during the enclosing of the cavity 218. The foregoing allows the graphite 14 to become directly radially compressed into the cavity 218 as the walls 274 become engaged with the surface 238 as illustrated in FIG. 6.

It should be noted that although the graphite 14 was expanded prior to enclosing it within the cavity 218, as evidenced by FIG. 5, the graphite 14 could be expanded after the cavity 218 has been enclosed by the surface 238 as was done in the embodiment illustrated in FIG. 2.

Figure 7:
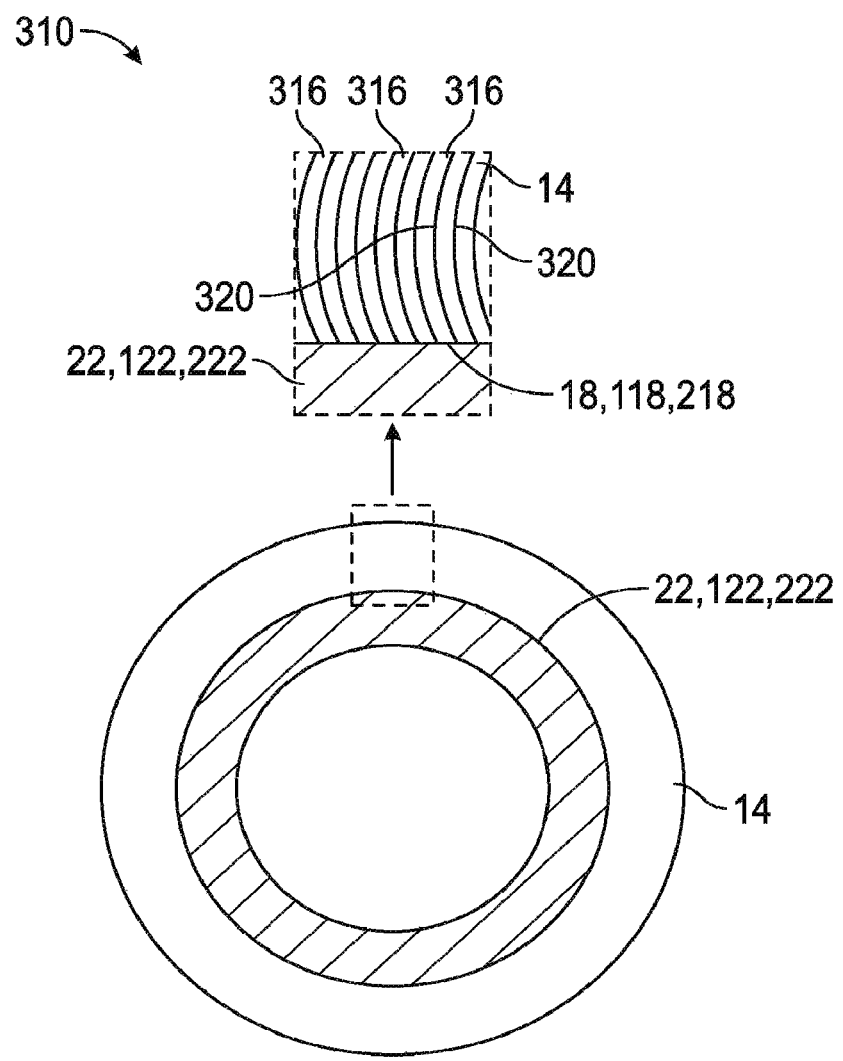
FIG. 7 depicts a partial cross sectional view of an alternate embodiment of a seal arrangement disclosed herein with a portion thereof shown at a greater magnification.

Referring to FIG. 7, an alternate embodiment of a seal arrangement disclosed herein is illustrated at 310 in cross section with a small portion shown magnified. The primary difference between the seal arrangement 310 and those of the embodiments discussed above is that the graphite 14 in this embodiment is in the form of a plurality of slabs 316. The slabs 316 are oriented in the cavity 18, 118, 218 of the body 22, 122, 222 such that faces 320 on opposing sides of the slabs 316, across the smallest dimension of the slabs 316, abut the faces 320 on slabs 316 perimetrically adjacent thereto. Thus the slabs 316 are stacked in this manner such that they substantially fill the full 360 degrees of the cavity 18, 118, 218.

Figure 8:
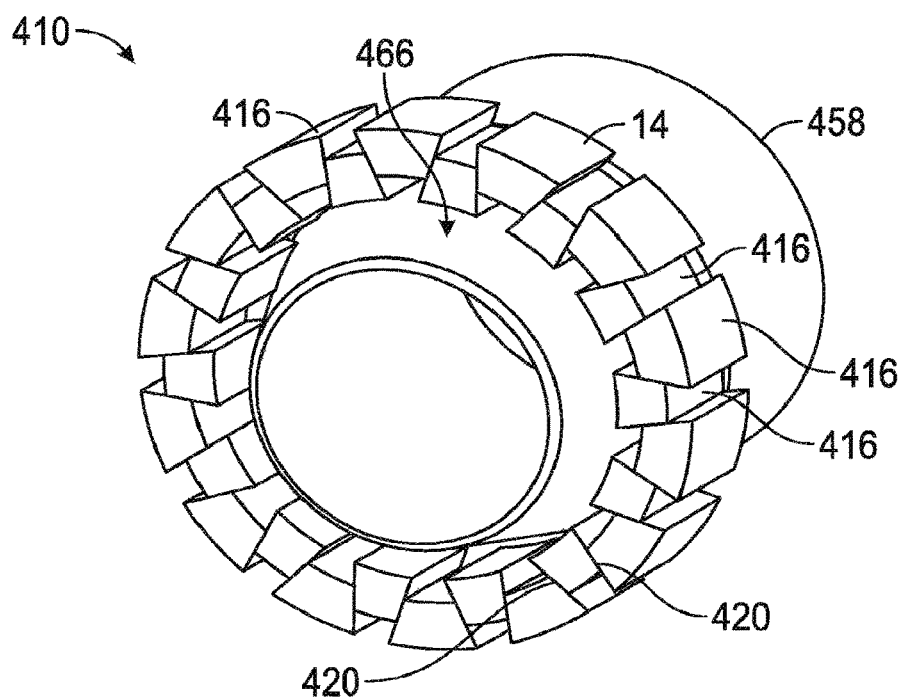
FIG. 8 depicts a perspective view of an alternate embodiment of a seal arrangement disclosed with the body and outer structure removed.
Figure 9:
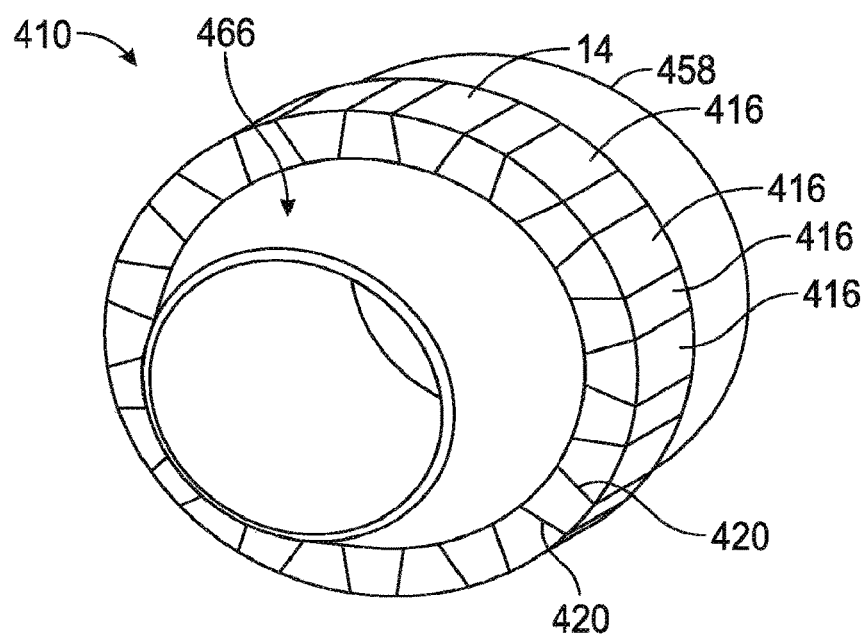
FIG. 9 depicts a perspective view of the embodiment of FIG. 8 at a different position.

Referring to FIGS. 8 and 9, another alternate embodiment of a seal arrangement disclosed herein is illustrated at 410. The arrangement 410 is similar to the arrangement 310 with the primary difference being the shapes of slabs 416 of the graphite 14. In this embodiment opposing faces 420 do not face directly 180 degrees from one another as they did in the arrangement 310 but instead are form an angle such that a cross section taken longitudinally through one of the slabs 420 substantially forms a trapezoid. Additionally, every other one of the slabs 420 distributed along the cavity 18, 118, 218 is flipped 180 degrees relative to both its neighbors. This orientation allows the faces 420 to remain abutted to one another as the slabs are moved radially outward such as along ramped portion 466 of tubular 458, for example. Allowing the faces 420 to remain abutted while they are moved radially outwardly may allow sealing to occur between the adjacent slabs 416 with less deformation of the slabs 416.

In some embodiments disclosed herein the graphite 14 employed is expandable graphite. One example of expandable graphite usable as the graphite 14 is disclosed in copending U.S. patent application Ser. No. 14/072016 filed Nov. 5, 2013 assigned to the same assignee as this application, the entire contents of which are incorporated herein by reference.

Set forth below are some embodiments of the foregoing disclosure:

Embodiment 1: A method of sealing, comprising positioning graphite within a cavity defined by walls of a body, shifting the body along a tapered surface of a first structure, expanding the body through an interaction with the tapered surface, engaging at least one second structure with the walls, expanding the graphite, compressing the graphite against the at least one second structure, and sealing the graphite to the at least one second structure and the body.

Embodiment 2: The method of sealing of any prior embodiment, further comprising maintaining the graphite within the cavity.

Embodiment 3: The method of sealing of any prior embodiment, further comprising resiliently compressing the graphite within the cavity.

Embodiment 4: The method of sealing of any prior embodiment, further comprising resiliently compressing a resilient member other than the graphite within the cavity.

Embodiment 5: The method of sealing of any prior embodiment, further comprising altering temperature of the graphite to cause it to expand.

Embodiment 6: The method of sealing of any prior embodiment, further comprising increasing volume of the cavity.

Embodiment 7: The method of sealing of any prior embodiment, further comprising maintaining the body longitudinally fixed in relation to the at least one second structure while expanding the body.

Embodiment 8: The method of any prior embodiment, wherein positioning graphite within the cavity defined by walls of a body includes positioning a graphite slab between two adjacent graphite slabs that define the walls.

Embodiment 9: The method of any prior embodiment, wherein positioning graphite within the cavity defined by walls of a body includes positioning the graphite in a cavity having a U-shaped cross-section.

Embodiment 10: The method of any prior embodiment, wherein expanding the graphite includes increasing a volume of the graphite between about 50% and about 200%.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of sealing, comprising:
    positioning graphite within a cavity defined by walls of an annular body;
    shifting the annular body along a tapered surface of a first annular structure;
    expanding the annular body through an interaction with the tapered surface;
    engaging at least one second annular structure with the walls;
    expanding the graphite radially outwardly through the interaction of the annular body with the tapered surface;
    compressing the graphite against the at least one second annular structure; and sealing the graphite to the at least one second annular structure and the annular body.

2. The method of sealing of claim 1, further comprising maintaining the graphite within the cavity.

3. The method of sealing of claim 1, further comprising resiliently compressing the graphite within the cavity.

4. The method of sealing of claim 1, further comprising resiliently compressing a resilient member other than the graphite within the cavity.

5. The method of sealing of claim 1, further comprising altering a temperature of the graphite to cause it to expand.

6. The method of sealing of claim 1, further comprising increasing a volume of the cavity.

7. The method of sealing of claim 1, further comprising maintaining the annular body longitudinally fixed in relation to the at least one second annular structure while expanding the annular body.

8. The method of claim 1, wherein the step of positioning the graphite within the cavity defined by the walls of the annular body includes positioning a graphite slab between two adjacent graphite slabs that define the walls.

9. The method of claim 1, wherein the step of positioning the graphite within the cavity defined by the walls of the annular body includes the cavity having a U-shaped cross-section.

10. The method of claim 1, wherein expanding the graphite includes increasing a volume of the graphite between about 50% and about 200%.

* * * * *